United States Patent [19]

Van Dusen

[11] Patent Number: 5,449,101
[45] Date of Patent: Sep. 12, 1995

[54] HITCH RACK FOR AN AUTOMOTIVE VEHICLE

[75] Inventor: Donn S. Van Dusen, Loma Rica, Calif.

[73] Assignee: Mascotech Accessories, Inc., Sacramento, Calif.

[21] Appl. No.: 143,694

[22] Filed: Oct. 27, 1993

[51] Int. Cl.⁶ ............................................. B60R 3/00
[52] U.S. Cl. ............................ 224/506; 224/42.01; 224/507; 224/521; 224/532; 224/536; 224/537; 224/924; 224/917.5; 280/506
[58] Field of Search ............... 224/42.45 R, 42.21, 224/42.03 B, 42.03 A, 42.01, 42.07, 42.08, 42.06, 42.44, 324; 280/506, 415.1, 416.1, 416.3, 504, 507

[56] References Cited

U.S. PATENT DOCUMENTS

| | | | |
|---|---|---|---|
| 3,613,971 | 10/1971 | Betz | 224/42.21 |
| 4,046,398 | 9/1977 | Dunwoody | 280/415.1 |
| 4,140,255 | 2/1979 | Weiler | 224/42.06 |
| 4,561,575 | 12/1985 | Jones | 224/42.21 |
| 5,190,195 | 3/1993 | Fulhart | 224/42.45 R |
| 5,303,857 | 4/1994 | Hewson | 224/42.21 |

*Primary Examiner*—J. Casimer Jacyna
*Assistant Examiner*—Steven O. Douglas
*Attorney, Agent, or Firm*—Flehr, Hohbach, Test, Albritton & Herbert

[57] ABSTRACT

A rack carrier for an automobile having a hitch receiver is described. The rack includes an article support structure to be secured to the hitch for movement between a position for transportation of the article by the vehicle and a position enabling access to such vehicle. The carrier includes an elongated arm that projects upward, which arm has the article support structure at its upper end. A bracket securable to the hitch has a cinch for maintaining the arm in its transportation position. The cinch includes a lever latch having a protuberance which engages a bearing surface, which protuberance is mounted for pivoting to a stop position beyond a center position at which it engages the bearing surface generally orthogonal to it. The construction further includes an arrangement which assures a rigid securance between the rack drawbar and a tow hitch receiver on a vehicle.

15 Claims, 2 Drawing Sheets

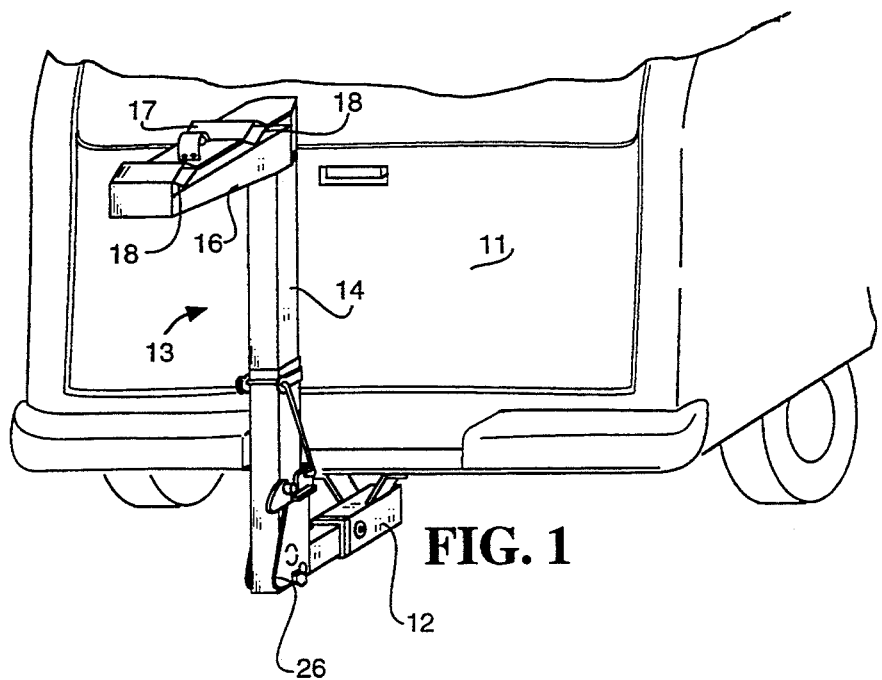
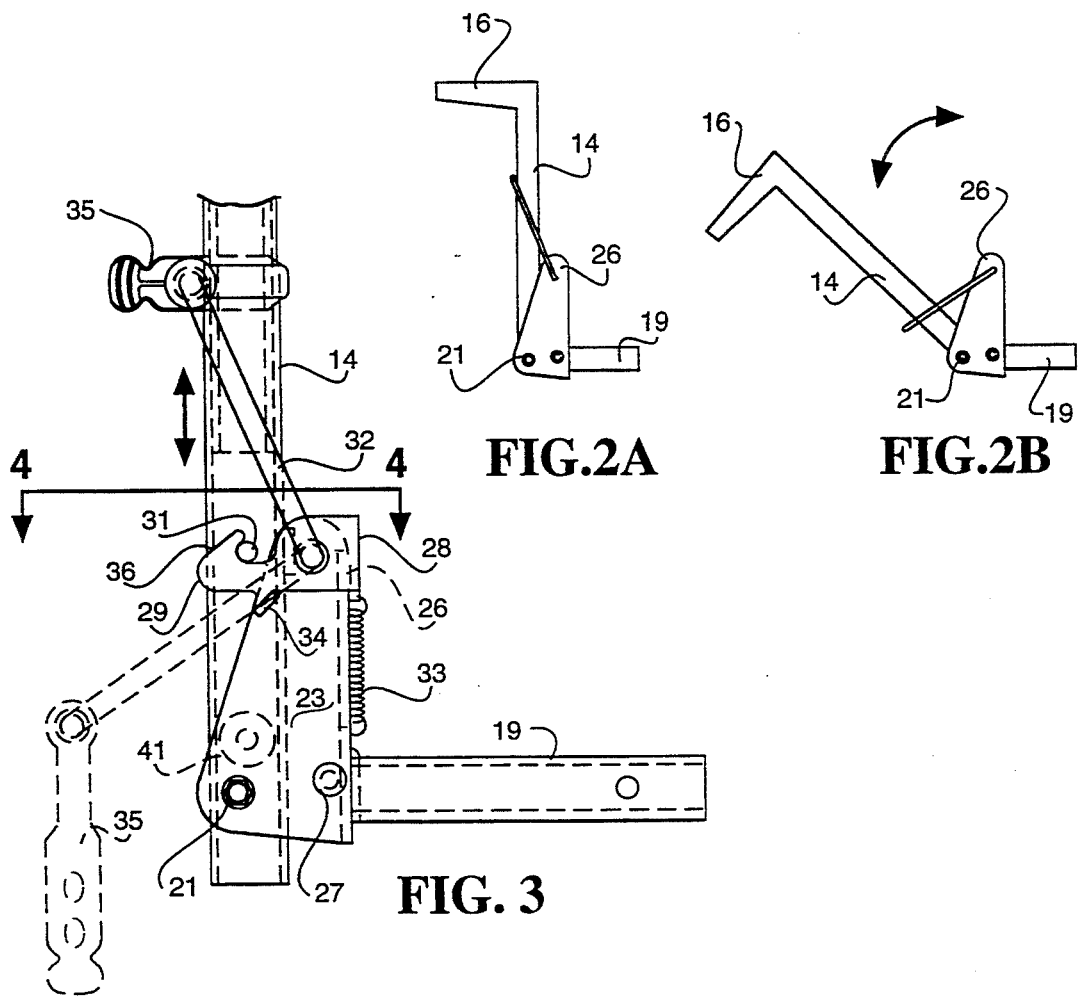

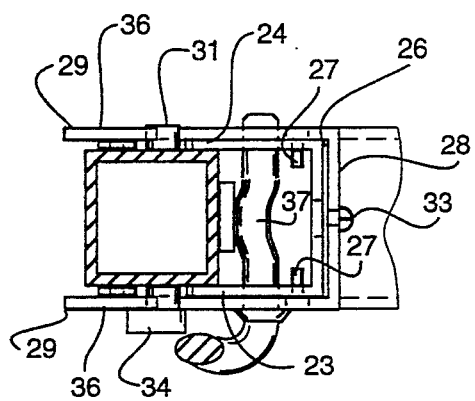
FIG. 4A
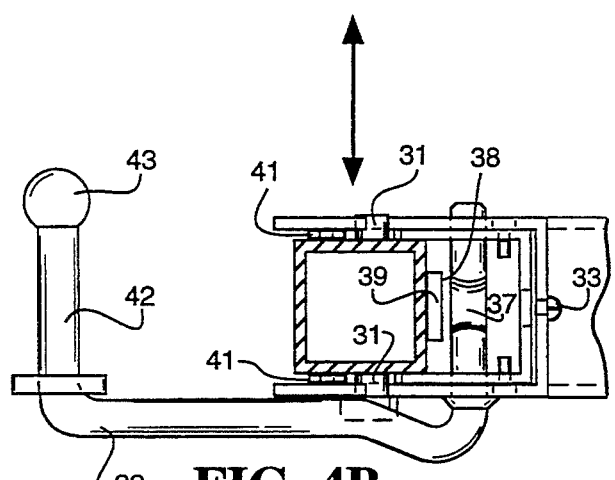
FIG. 4B
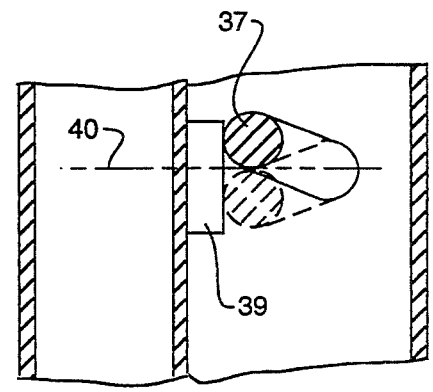
FIG. 5
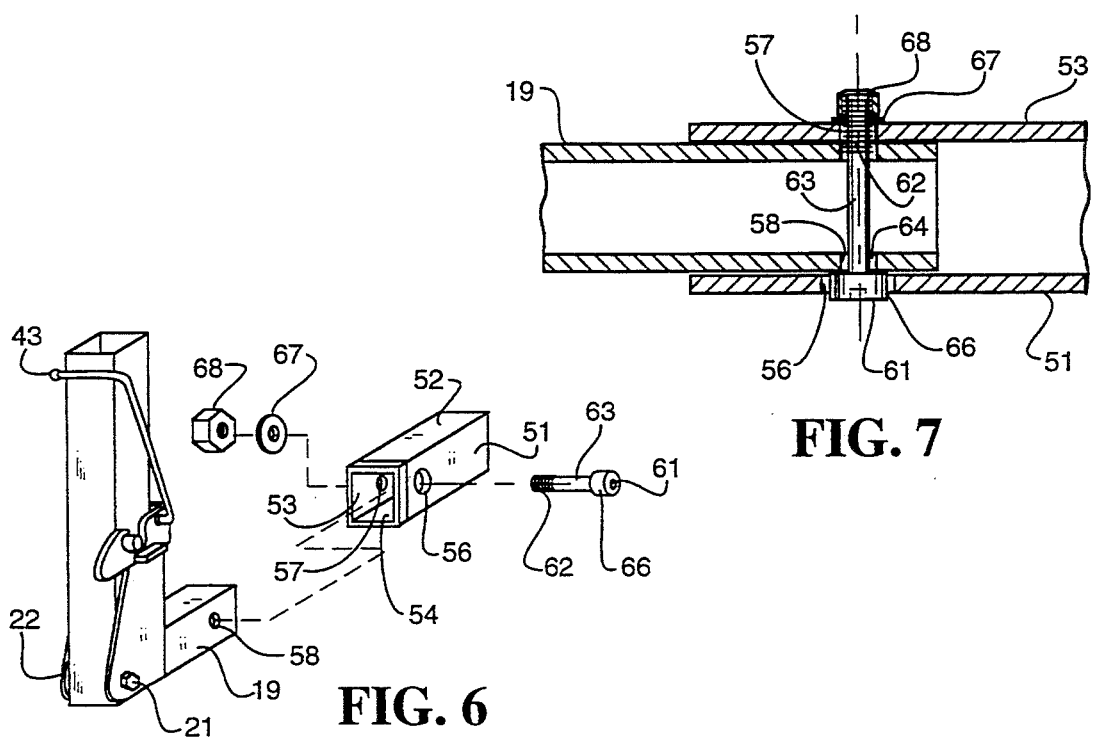
FIG. 6
FIG. 7

5,449,101

HITCH RACK FOR AN AUTOMOTIVE VEHICLE

BACKGROUND OF THE INVENTION

The present invention relates to automotive vehicle racks and, more particularly, to a hitch carrier rack.

Hitch carrier racks for automotive vehicles are increasingly desirable. Such a rack has a coupler to be received in the receptacle of a receiver-type tow hitch which normally is used to receive a coupling arrangement for connection to a trailer to be towed. There are, for example, hitch rack bike carriers. A hitch bike carrier is a rack which suspends one or more bicycles at the rear of an automotive vehicle (or sometimes at the front of a large vehicle), with the bicycle support structure cantilevered upwardly from a hitch receiver on the vehicle.

It is desirable in such an arrangement that the rack be movable to allow access to a gate, door or other part of the vehicle. While various mechanisms have been provided in the past to allows the rack to be moved to such an inactive position, the problem with most is that the necessary pivot joints, etc., introduce play in the rack construction. It will be appreciated that because of the cantilever suspension of the bike or other article support structure, a minor lack of rigidity introduced by a joint can be magnified to be a major problem.

SUMMARY OF THE INVENTION

The present invention relates to a rack cantilever construction which allows a bike or other article support structure which is cantilevered from a hitch on a vehicle to be moved between transportation and inactive positions, without introducing play as is typical. In its broad aspects, the cantilever construction of the invention includes the combination of an elongated arm having the article support structure, and a bracket for the arm connectable, for example, to a tow hitch of a vehicle. The arm is movable relative to the bracket between the transportation position and in inactive position, and a cinch is provided on the bracket for normally maintaining the arm in the transportation position but releasing the same for movement to the inactive position. The cinch has a lever latch which, in keeping with the invention, is manipulatable of the cinch to an over-center position. That is, the cinch has, besides the normal catching elements, a latch which is manipulatable to an over-center position to tighten the remainder of such cinch even though a relatively loose normal cinch arrangement is provided for easy latching of the arm in the transportation position.

The tightener most simply is provided as a protuberance on the lever latch which is mounted for pivoting to a stop position beyond a center position at which it would be generally orthogonal to a bearing surface it engages. It should be noted that although in the preferred embodiment the protuberance is part of the lever latch, from the broad standpoint it could be a portion of any other part of the cinch. Moreover, although it is stated that the article support structure is on the elongated arm, it may be indirectly on the same. That is, there are many different arrangements of cantilever constructions and it is not necessary that the article support structure be directly on the arm or other structure which is responsible for the cantilever.

The lever latch is positioned and configured for actuation by a foot of a user to release the same while maintaining the user's hands free. Such lever latch most desirably includes a foot engagement bar which also acts as an obstruction to stop the article support structure via the arm from moving beyond a set release position.

The combination also preferably includes a coupler having a tightener designed to maintain intimate contact between a surface of the drawbar and a surface of the tow hitch irrespective of vehicle movement. More particularly, the coupler applies appropriate opposing forces about overlapping surfaces of the drawbar and tow hitch so that the drawbar is tightened against one side wall of the tow hitch.

Other features and advantages of the invention either will become apparent or will be described in connection with the following, more detailed description of a preferred embodiment of the invention.

BRIEF DESCRIPTION OF THE DRAWING

With reference to the accompanying drawing:

FIG. 1 is a broken-away isometric rear view of a vehicle illustrating a preferred embodiment of the rack of the invention secured to a tow hitch of the vehicle;

FIGS. 2A and 2B are schematic side elevation views of the rack illustrating two differing positions of the same;

FIG. 3 is an enlarged broken-away side elevation view of the cinch arrangement of the instant invention FIGS. 4A and 4B are sectional views taken on a plane indicated by the lines 4—4 in FIG. 3, illustrating the over-center portion of the cinch;

FIG. 5 is an enlarged broken-away sectional view of the over-center portion of the cinch;

FIG. 6 is an isometric and exploded view illustrating the relationship of the invention to a hitch receiver; and FIG. 7 is a part sectional view illustrating the hitch rack carrier of the invention secured in position to a tow hitch.

DETAILED DESCRIPTION OF THE PREFERRED EMBODIMENT

The following relatively detailed description is provided to satisfy the patent statutes. However, it will be appreciated by those skilled in the art that various changes and modifications can be made without departing from the invention.

The rear end 11 of an automotive vehicle is illustrated in FIG. 1, with a standard tow hitch receiver construction 12 depending therefrom. A hitch rack carrier of the invention, generally referred to by the reference numeral 13, is shown in place of the ball or other arrangement typically associated with a tow hitch of this nature. Such rack includes an elongated arm 14 having at its upper end, an article support structure 16. Such article support structure in this embodiment is designed to carry bikes and, in this connection, includes a clamp 17 for securing the top rails of two bikes within V-shaped grooves 18.

It will be appreciated that with the arrangement described, the bikes are suspended from the support structure parallel to the elongated arm 14 which extends upwardly from the level of the hitch 12. While the invention is particularly useful with racks that are designed to suspend an article fully, full suspension is not necessary. For example, it is useful in ski racks or the like to prevent the cantilevered rack portion from moving. It will be recognized that when the sporting article being carried extends beyond the support structure, any undesirable play at the location of the hitch will be magnified at the free end(s) of the sporting equipment to even a greater extent.

FIGS. 2A and 2B schematically illustrate the two different positions. The active position shown in FIG. 2A is the transportation position, i.e., the position during movement of the vehicle. The inactive (release) position shown in FIG. 2B is one providing access to the rear of the vehicle without the rack needing to be removed from the hitch.

A drawbar 19 is provided as part of the rack to secure it to a vehicle. As will be discussed hereinafter, such securance is designed in the instant arrangement to assure that there is a rigid connection between the rack and the vehicle tow hitch. Arm 14 is part of a cantilever construction arrangement for the rack. It is pivotally mounted by pins 21 and 22 between a pair of opposed walls 23 and 24 of a U-shaped bracket 26. The bracket defines a cavity between such walls which receives the arm. Such arm is pivotable between the transportation position and the inactive position as defined by stop pins 27.

Bracket 26 includes a cinch to maintain the arm selectively in its transportation position. This cinch includes a spring loaded U-shaped hooking member 28 pivotally mounted on a portion of a lever latch (to be described in more detail hereinafter) 32 which extends between the walls 23 and 24. Hooking member 28 terminates in a pair of hooks 29 which engage associated pins 31 projecting from opposite sides of the arm 14. Such hooking member 28 is spring-loaded in tension by a coil spring 33 connected between a protuberance on the same and the body of the remainder of the bracket. It will be seen that such coil spring normally maintains the hooks 29 in engagement with the respective pins 31 as illustrated in FIG. 3. The lever latch 32, though, is movable downward to a position in which it engages a stop flange 34 on the hooking member to pivot the latter as necessary to release the pins 31 and, hence, the arm 14 for pivoting to the inactive position. Each of the hooks 29 includes a cam surface 36 which is engaged by the pin associated with the hook as the arm is pivoted toward its transportation position. This engagement moves the cinch downward against the spring pressure and permits it to engage the pin.

It will be seen from the above that the pin latch portion of the cinch normally maintains the arm in the transportation position but enables it to be simply released when it is desired to pivot the arm 14 and article support structure to the inactive position.

It is movement of the lever latch 32 from the home locking position shown in solid in FIG. 3 to the position shown in phantom which results in release of the pin latch. (A rubber strap 35 is included on the end of the lever latch to secure the latch against the arm 14 in the locking position.) It will be appreciated that to actually release the pin latch, the lever latch 32 must be moved slightly downward from the position shown so as to coact with the stop flange 34 to move the hooks 29.

In keeping with the invention, movement of the lever latch 32 to its home position will manipulate the cinch to an over-center position. The portion of the lever arm which extends between the walls 23 and 24 of the bracket, includes a protuberance 37 which engages an exposed surface 38 of a bearing pad 39. This protuberance is so positioned relative to the remainder of the latch 32 that just before the lever latch reaches the locking position it passes beyond a center position on the bearing surface at which it would be generally orthogonal to such bearing surface. This is illustrated in FIG. 5 which shows the lever latch protuberance engaging the bearing surface just before the center, which center is represented by the intersection with such surface of the line 40. It then moves as the lever latch reaches its locked home location, to the over-center position which is illustrated. In such position it acts to apply force to the arm 14 to keep the pins 31 in tight engagement with the respective hooks 29. The cinch thus includes not only a pin latch for providing initial securance of the arm 14 in the desired position, but a tightening arrangement (through the lever latch) which tends to remove any play in such latch, thereby holding the arm 14 and the article support structure 16 in the transportation position. Such tightening is automatic, i.e., achieved simply by moving the lever latch to its home locking position.

It should be recognized that the inclusion of the tightening over-center arrangement relieves somewhat the tolerance requirements on the pin latch and, hence, makes use of the same in this type of arrangement realistic. It also will be recognized that although in the preferred embodiment the over-center position is the upper position, the cinch, including the over-center lock, can be modified to have the release position the upper position and the home locking position the lower position.

A pair of friction elements are positioned to inhibit initial free movement of the arm 14 upon release of the cinch. Such friction elements simply are a pair of cylindrical plastic shims 41 secured on opposite sides of the arm between such arm and the bracket side walls. These elements provide friction surfaces which engage the bracket as the arm pivots, and tend to inhibit such pivoting. The surface material and the engagement pressure are selected to counteract the weight of the article support structure. Thus, if the cinch should be unintendedly released, such as by a child, the article support structure will not simply fall. An exertion, although small, must still be applied to the arm to cause pivoting.

The position and shape of the lever latch facilitates foot operation so that a user's hands are free for manipulation of the support structure or for other purposes. That is, the lever latch includes a foot/hand engagement bar 42 which extends generally parallel to the rear of a vehicle when the rack is connected thereto. Such foot engagement bar includes an end knob 43 which projects outward of all other structure of the carrier adjacent to it to permit access to the lever by a user's foot. It will be appreciated that when the lever is in its locking position illustrated in FIG. 3, it is in close proximity to the arm 14. The portion of the engagement bar represented by knob 43 permits the foot of a user to have the access necessary to initiate the movement of the lever. It should be noted that when the foot engagement bar is released, it returns against the spring loading to the position shown in phantom in FIG. 3. In such position, the bar acts as an obstruction to prevent further pivoting of the arm 14 should pins 27 fail (see FIG. 2B).

Drawbar 19 is securable to the hitch 12 by an arrangement which assures that it is a rigid construction. FIG. 6 shows an exploded isometric view of this arrangement. Tow hitch receiver 12 has four walls 51, 52, 53, and 54. At least two bolt holes 56 and 57 are located respectively on opposite walls 51 and 53. The tow hitch receiver enables drawbar 19 to interface with the tow hitch by telescoping. In the telescoped position, the walls of the drawbar 19 are located within the walls of the receiver 12 such that at least one bolt hole 58 in the drawbar aligns with receiver bolt hole 56. Typically, two bolt holes on opposite walls of the drawbar align with the two bolt holes 56 and 57 on opposite walls of the receiver.

The bolt hole alignment allows a portion of a tightener 61 to be inserted through the bolt holes to secure the hitch drawbar 19 to the tow hitch receiver 12. The tightener 61, which is cylindrically shaped in this embodiment, comprises a threaded tail 62, a midsection 63, a shoulder 64, and a head 66. A washer 67 and a nut 68 are coaxially coupled and tightened onto the tightener tail 62. (The relationship of the nut 68 and the washer 67 is such that references to the nut includes the washer. However, the washer is not necessarily essential to the performance of the nut 68.)

The diameter of the shoulder 64 is smaller than the diameter of the tow hitch bolt hole. The diameter of the shoulder 64, however, is larger than the diameter of the bolt hole 58 in the drawbar. Finally, to allow a portion of the tightener 61 to be inserted into the aligned bolt holes, the diameters of the aligned-bolt holes are each larger than the diameters of the tail 62 and midsection 63 of the tightener 61.

As shown in the top cross sectional view of FIG. 7, nut 68 is tightened around the threaded tail 62 of the tightener 61 and applies a force on the surface it is touching, namely the outer surface of the tow hitch wall 53 containing bolt hole 57. Consequently, the shoulder 64 also applies a force against the surface of the drawbar it is touching, namely the outer surface of the wall containing bolt hole 58. The opposed overlapping surfaces are the outer surface of the drawbar wall containing bolt hole 69 and the inner surface of the tow hitch wall 53 containing bolt hole 57.

It will be seen that the hitch connection described above cooperates with the rack latch arrangement to provide a rigid securance for the bicycles or other articles supported by the rack. As mentioned at the beginning of the detailed description, applicant is not limited to the specific embodiment described above. The claims, their equivalents and their equivalent language define the scope of protection.

What is claimed is:

1. In an automotive vehicle rack having article support structure adapted to project from a vehicle for movement between a position for transportation of said article and an inactive position, a construction comprising the combination of:
   (a) an elongated arm connected to and projecting from said article support structure; and
   (b) a bracket for interacting with said elongated arm as said article support structure moves with said arm between said transportation position and said inactive position, said bracket having a cinch to maintain said arm selectively in said transportation position, said cinch having a latch for holding said arm when said article support structure is in said transportation position and a lever for manipulating said latch to release said arm and said article support structure from said transportation position, said arm including a bearing surface having an over-center location thereon, said lever being rotatable about an axis adjacent said arm, said lever further including a protuberance rotatable about said axis between a release position in which said protuberance is on one side of said over-center location on said bearing surface when said lever releases said latch and a locked position in which said protuberance is on the other side of said over-center location in which said protuberance engages said bearing surface at said over-center location, thereby holding said elongated arm and said article support structure in said transportation position.

2. The automotive vehicle rack of claim 1 wherein said bracket defines a cavity which receives said arm.

3. The automotive vehicle rack of claim 1 wherein said latch is a pin latch for maintaining said arm in said transportation position, said pin latch including a pin on one of said arm and bracket which is engageable by a hook on the other of said arm and bracket.

4. The automotive rack of claim 3 wherein said hook is pivotally mounted on said bracket and includes a cam surface engageable by a pin on said elongated arm as said arm is brought to said transportation position to pivot said hook and enable the same to engage said pin.

5. The rack for an automotive vehicle having a hitch receiver according to claim 1 further including a coupler for connecting said rack to said hitch receiver, said coupler comprising:
   a drawbar having a surface configured to overlap and oppose a surface of said receiver to provide opposed overlapping surfaces; and
   a tightener which applies force to maintain the overlapping surfaces together.

6. The rack for an automotive vehicle having a hitch receiver of claim 5 wherein the drawbar is configured to telescope within said hitch receiver so that an exterior surface of the drawbar overlaps an interior surface of the drawbar to provide the opposed overlapping surfaces.

7. The rack for an automotive vehicle having a hitch receiver of claim 6 wherein the drawbar has at least one bolt hole and the hitch receiver has at least one bolt hole; and the relative locations of the bolt holes are such that when the drawbar is telescoped within the receiver, at least one particular relative telescoped position of the drawbar and receiver exists in which the bolt hole in the receiver is aligned with the bolt hole in the drawbar.

8. The rack for an automotive vehicle having a hitch receiver of claim 7 wherein the diameter of the aligned bolt hole on the drawbar is smaller than the diameter of a corresponding aligned bolt hole on the tow hitch.

9. The rack for an automotive vehicle having a hitch receiver according to claim 1 wherein said lever includes a foot engagement bar which extends generally parallel to said vehicle when said rack is connected thereto.

10. A hitch rack carrier for an automotive vehicle having a hitch receiver at the rear thereof, which rack includes an article support structure to be secured to said hitch for movement between a position for transportation of said article and a position enabling access to said vehicle, a cantilever construction comprising the combination of:
   (a) an elongated arm having said article support structure; and
   (b) a bracket defining a cavity which receives said arm, which bracket is securable to said hitch receiver and has a cinch for maintaining said arm in said transportation position, said cinch having a protuberance on a lever latch for manipulating such cinch to an overcenter position, which protuberance is mounted for pivoting to a stop position beyond a center position at which it engages to a bearing surface therefor generally orthogonal thereto.

11. The hitch rack of claim 10 wherein said cinch also includes a pin latch for maintaining said arm in said transportation position, said pin latch including a pin on one of said arm and bracket which is engageable by a hook on the other of said arm and bracket.

12. The hitch rack of claim 10 further including a coupler for connecting said rack to said hitch receiver, said coupler comprising:

a drawbar configured to telescope within said receiver so that an exterior surface of the drawbar overlaps an interior surface of the tow hitch to provide opposed overlapping surfaces, said drawbar having at least one bolt hole and said receiver having at least one bolt hole, the relative locations of the bolt holes being such that when the drawbar is telescoped within the receiver at least one telescoped position exists in which the bolt hole in the receiver is aligned with the bolt hole in the drawbar, and the diameter of the aligned bolt hole on the drawbar being smaller than the diameter of a corresponding aligned bolt hole on the receiver; and a tightener which applies force to maintain the overlapping surfaces together.

13. The hitch rack of claim 12 wherein the tightener comprises:

a tail whose diameter is smaller than the diameters of all aligned bolt holes on the drawbar and the tow hitch;

a midsection located between a shoulder and the tail whose diameter is smaller than the diameters of all aligned bolt holes on the drawbar and the tow hitch;

a shoulder wherein the shoulder's diameter is larger than that of the midsection; and a head that is attached to the shoulder.

14. The hitch rack of claim 10 wherein said lever latch is positioned and configured for actuation by a foot of a user to release said cinch while maintaining the hands of such user free.

15. The hitch rack of claim 14 wherein said lever latch includes a foot engagement bar which extends generally parallel to said vehicle when said rack is connected thereto.

* * * * *